United States Patent
Weidner

(10) Patent No.: US 11,435,003 B2
(45) Date of Patent: Sep. 6, 2022

(54) PRESSURE REDUCER

(71) Applicant: Pittway Sarl, Rolle (CH)

(72) Inventor: Kurt Weidner, Aalen (DE)

(73) Assignee: Pittway Sarl, Rolle (CH)

( * ) Notice: Subject to any disclaimer, the term of this patent is extended or adjusted under 35 U.S.C. 154(b) by 0 days.

(21) Appl. No.: 16/868,709

(22) Filed: May 7, 2020

(65) Prior Publication Data

US 2020/0355286 A1   Nov. 12, 2020

(30) Foreign Application Priority Data

May 8, 2019   (DE) ........................ 102019111981.2

(51) Int. Cl.
*F16K 17/196*   (2006.01)
*F16K 17/04*   (2006.01)
(Continued)

(52) U.S. Cl.
CPC ......... *F16K 17/048* (2013.01); *G05D 7/0635* (2013.01); *G05D 16/0636* (2013.01)

(58) Field of Classification Search
CPC . F16K 17/048; G05D 7/0635; G05D 16/0636
(Continued)

(56) References Cited

U.S. PATENT DOCUMENTS

| 646,428 A | * | 4/1900 | Hardie | ..................... F16K 17/40 |
| | | | | 137/71 |
| 783,528 A | * | 2/1905 | Kipp | ................... F16K 17/0433 |
| | | | | 137/494 |

(Continued)

FOREIGN PATENT DOCUMENTS

| CN | 101963537 A | 2/2011 |
| DE | 19539239 C2 | 5/1998 |

(Continued)

OTHER PUBLICATIONS

Research Report of the Intellectual Property Office of Germany for DE102019111981.2 with search date of Dec. 16, 2019.

(Continued)

*Primary Examiner* — Minh Q Le
(74) *Attorney, Agent, or Firm* — Shumaker & Sieffert, P.A.

(57) ABSTRACT

Pressure reducer (10) having a housing (11) with a valve (12) positioned in said housing (11), wherein in closed position the valve (12) separates an inlet pressure chamber (13) of the housing (11) from an outlet pressure chamber (14) of the housing (11), and in open position connects the inlet pressure chamber (13) and the outlet pressure chamber (14), wherein the valve (12) has a diaphragm (16) acting on a valve tappet (15), on which diaphragm, by providing a pressure reducing function, a spring force of a spring element (17) acting in the opening direction of the valve (12) acts on the one hand and a force that is a function of the pressure prevailing in the outlet pressure chamber (14) acting in the closing direction of the valve (12) acts on the other hand, wherein the valve (12) has, attached to the valve tappet (15), a valve body (21) which, in closed position, bears against a valve seat (22) in a sealing manner and which in open position is raised off the valve seat (22), and wherein the spring element (17) is arranged between spring plates (18, 19), namely between a spring plate (18) facing the diaphragm (16) and a spring plate (19) facing away from the diaphragm (16). A sensor (27) for detecting leakage is integrated into the pressure reducer.

15 Claims, 3 Drawing Sheets

Figure 1:
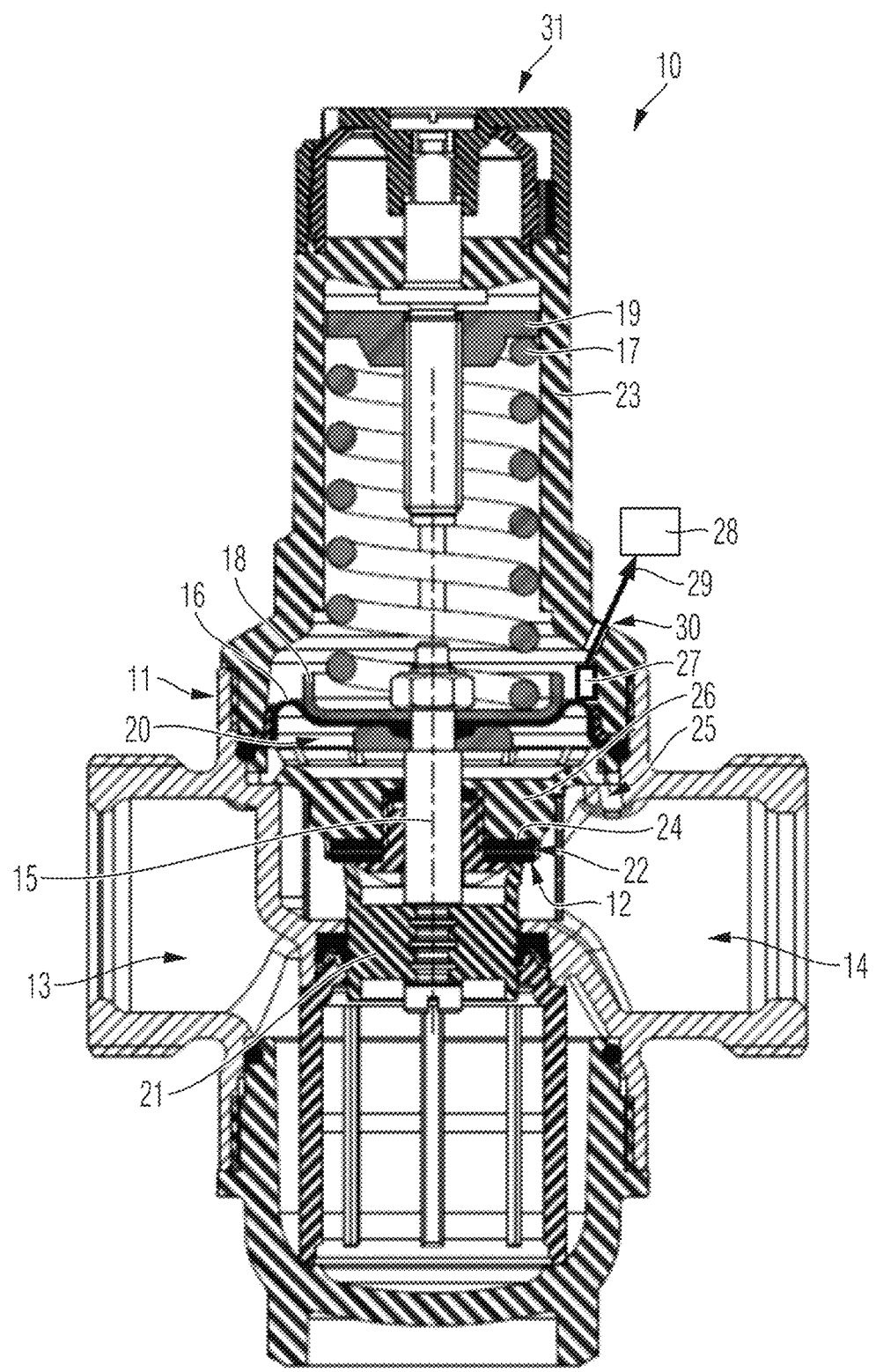

(51) Int. Cl.
*G05D 7/06* (2006.01)
*G05D 16/06* (2006.01)

(58) Field of Classification Search
USPC ............... 137/455, 488, 505, 505.14, 505.36
See application file for complete search history.

(56) References Cited

U.S. PATENT DOCUMENTS

| | | | | |
|---|---|---|---|---|
| 5,279,327 | A * | 1/1994 | Alsobrooks | G05D 16/0636 137/510 |
| 6,039,071 | A * | 3/2000 | Tomita | F16K 1/42 137/505.37 |
| 6,328,054 | B1 * | 12/2001 | Martin | G05D 16/0619 137/15.17 |
| 6,629,544 | B2 * | 10/2003 | Nakajima | G05D 16/0663 137/505 |
| 7,192,665 | B2 * | 3/2007 | Nakajima | H01M 8/04089 429/444 |
| 8,459,288 | B2 * | 6/2013 | Ishikawa | F02M 21/0239 137/15.19 |
| 2005/0087234 | A1 | 4/2005 | Ito | |
| 2006/0191314 | A1 * | 8/2006 | Karte | G05B 23/0256 73/1.72 |
| 2008/0004836 | A1 * | 1/2008 | Tewes | G05B 23/0221 702/182 |
| 2011/0277854 | A1 * | 11/2011 | Yamamoto | G05D 16/0655 137/455 |
| 2013/0000753 | A1 * | 1/2013 | Penning | F15B 19/002 137/487.5 |
| 2013/0153058 | A1 * | 6/2013 | Hecking | G05D 16/0655 137/505 |
| 2014/0102559 | A1 * | 4/2014 | Grenaway | G05D 16/00 137/505 |
| 2014/0261785 | A1 * | 9/2014 | Andersson | G05D 16/0658 137/505 |
| 2014/0290760 | A1 * | 10/2014 | Iitaka | G05D 16/10 137/505 |
| 2020/0110429 | A1 * | 4/2020 | Hart | G05D 16/16 |
| 2020/0159259 | A1 * | 5/2020 | Jeon | H01M 8/04089 |

FOREIGN PATENT DOCUMENTS

| | | |
|---|---|---|
| DE | 10 2004 006 158 A1 | 9/2005 |
| DE | 10 2007 026 162 A1 | 5/2008 |
| EP | 3239682 A1 | 11/2017 |
| KR | 200463311 Y1 | 10/2012 |
| WO | 2014/029699 A1 | 2/2014 |

OTHER PUBLICATIONS

English machine translation of Research Report of the Intellectual Property Office of Germany for DE102019111981.2 with search date of Dec. 16, 2019.

European Search Report, in the German language, from counterpart European Patent Application No. 20173248.4, dated Aug. 28, 2020, 7 pp.

* cited by examiner

PRESSURE REDUCER

This application claims the benefit of German Patent Application No. 102019111981.2 filed on May 8, 2019, the disclosure of which is herein incorporated by reference in its entirety.

The invention relates to a pressure reducer according to the preamble of Claim 1.

Pressure reducers are preferably used in industrial plants and water supply systems of houses or buildings in order to provide a constant outlet pressure in the case of a fluctuating inlet pressure. A pressure reducer is preferably installed in a cellar of a building or in a service shaft so that there is no risk of the pressure reducer freezing. However, the need to provide a constant water pressure does not just exist for industrial plants and water supply systems; in fact, there are also other fields of application which have to be supplied at a constant water pressure. Pressure reducers installed outdoors are rendered inoperative in the case of frost, with a draining of said device ensuing.

A pressure reducer is known from DE 195 39 239 C2. The pressure reducer known from said prior art comprises a housing and a valve positioned in the housing, wherein the valve in a closed position separates an inlet pressure chamber of the housing from an outlet pressure chamber of the housing and in an open position connects the inlet pressure chamber and the outlet pressure chamber. The valve known from this prior art has a diaphragm acting on a valve tappet, on which diaphragm, by providing a pressure reducing function, a spring force of a spring element acting in the opening direction of the valve acts on the one hand and a force that is a function of the pressure prevailing in the outlet pressure chamber acting in the closing direction of the valve acts on the other hand.

Attached to the valve tappet is a valve body which presses with a sealing element against a valve seat in the closed position of the valve and is raised off the valve seat in the open position of the valve. The spring element is arranged between preferably two spring plates, namely between a spring plate facing the diaphragm and a spring plate facing away from the diaphragm.

Particularly in the case of a pressure reducer installed in a building or a house, considerable damage can be caused by leakage if there is a leakage point in the water supply system downstream of the pressure reducer. To date, it has been difficult to reliably detect such a leakage which may form downstream of a pressure reducer.

A device for the detection of leakages in a water supply system is known from EP 3 239 682 A1. In said prior art, it is proposed to detect on the leakage detection device the movement of a tappet with the aid of a sensor and to conclude that a leakage exists as a function of the movement of the tappet.

The device known from EP 3 239 682 A1 for detecting leakage is a separate assembly which has to be installed separately in a water supply system.

The object of the invention is to create a novel pressure reducer.

This object is achieved by a pressure reducer according to Claim 1. According to the invention, a sensor for detecting leakage is integrated into the pressure reducer.

With the present invention, it is proposed for the first time to integrate a sensor for detecting leakage into the pressure reducer. Through the functional integration of leakage detection into the pressure reducer, the pressure reducer can assume two tasks, namely the pressure-reducing function and the leakage detection function. It is not necessary to install a separate leakage detection device.

According to an advantageous further development of the invention, the sensor is integrated into a non-fluid-conducting region of the pressure reducer. The sensor is preferably associated with the spring plate facing the diaphragm or cooperates with the spring plate facing the diaphragm. The integration of the sensor into the non-fluid-conducting region of the pressure reducer, namely the association thereof with or the cooperation thereof with the spring plate facing the diaphragm, is particularly preferred for integrating the sensor into the pressure reducer. In particular, a capacitive sensor or inductive sensor is used which detects a leakage-induced movement of the spring plate facing the diaphragm in the micrometer range.

According to an advantageous further development of the invention, the sensor is coupled to a control unit which, when said unit detects a leakage greater than a limit value, closes the valve. In this way, it is then possible not only to detect the leakage, but to close the valve in the event of a detected leakage in order to avoid damage caused by leakage.

Figure 2:
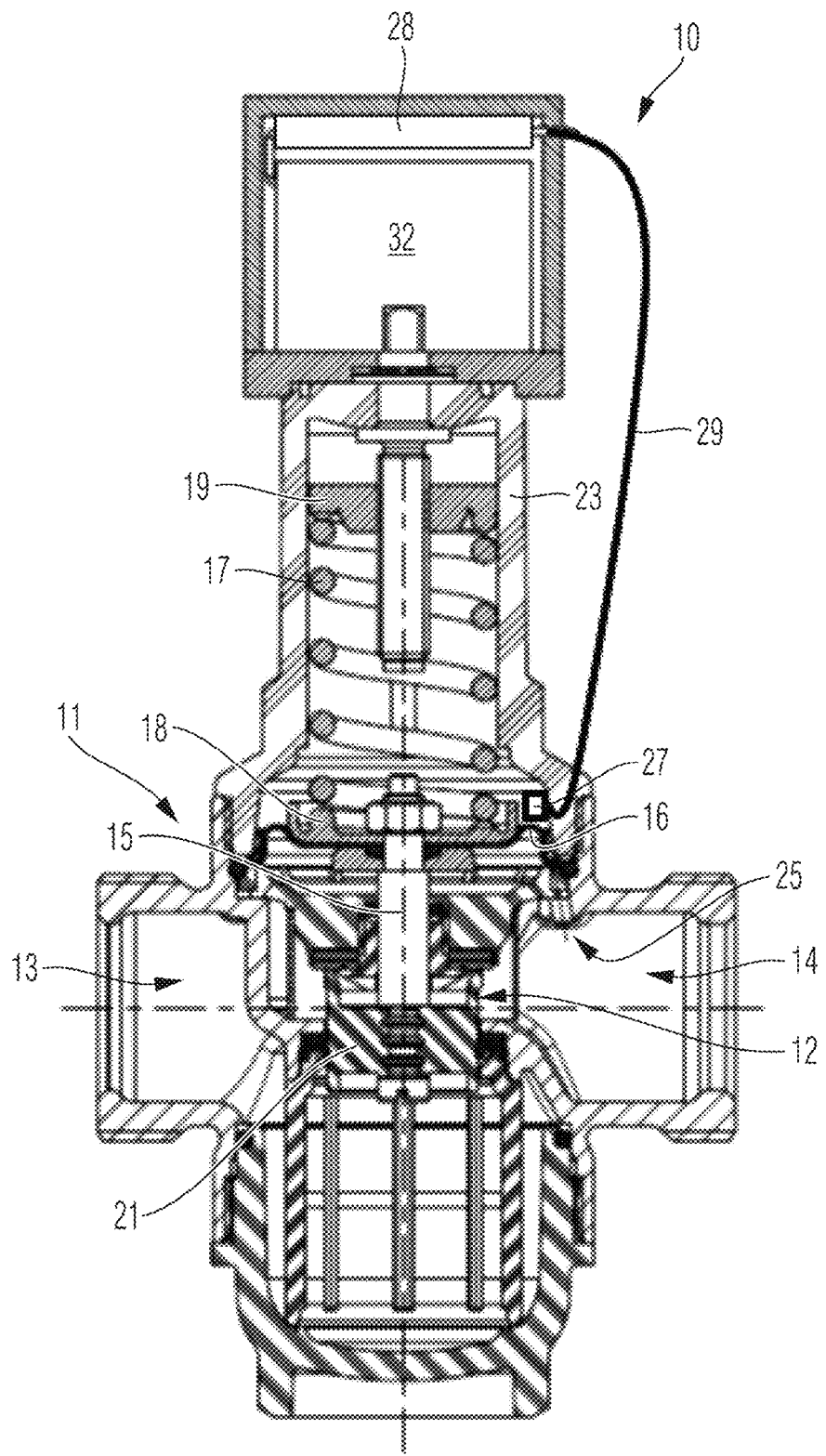
Figure 3:
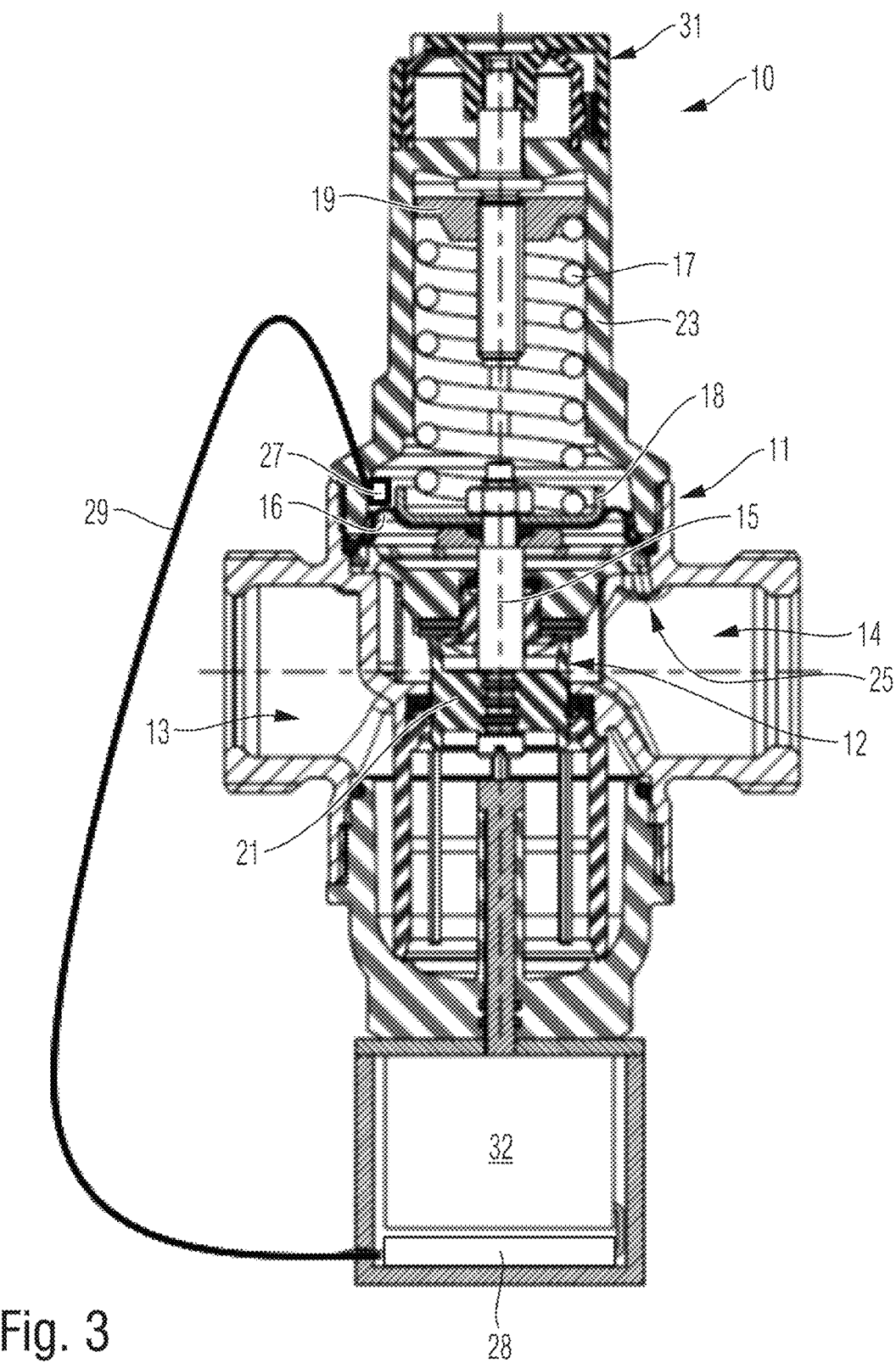

Preferred developments of the invention result from the subclaims and the following description. In the following, an exemplary embodiment of the invention is explained in more detail with reference to the drawing without the invention being limited to said embodiment. The drawing shows:

FIG. 1 a cross-section through a first exemplary embodiment of a pressure reducer according to the invention;

FIG. 2 a cross-section through a second exemplary embodiment of a pressure reducer according to the invention;

FIG. 3 a cross-section through a third exemplary embodiment of a pressure reducer according to the invention.

FIGS. 1, 2 and 3 each show a cross-section through an exemplary embodiment of a pressure reducer 10 according to the invention.

The pressure reducer 10 according to the invention has a housing 11, wherein a valve 12 is positioned in the housing 11. In the closed position, the valve 12 separates an inlet pressure chamber 13 of the housing 11 from an outlet pressure chamber 14 of the housing 11, wherein in the open position of the valve 12 the inlet pressure chamber 13 and the outlet pressure chamber 14 are coupled.

The valve 12 of the pressure reducer 10 has a valve tappet 15 with which a diaphragm 16 engages. A spring force, which is provided by a spring element 17, acts on the diaphragm 16, wherein the spring element 17 in FIG. 1 is arranged between two spring plates 18, 19. A first spring plate 18 faces the diaphragm 16. A second spring plate 19 faces away from the diaphragm 16. The first spring plate 18 and the diaphragm 16 are attached to each other.

In addition to the spring force of the spring element 17, a force acting in the closing direction of the valve 12 of the pressure reducer 10 acts on the diaphragm 16, wherein this force is a function of a pressure which prevails in a pressure chamber 20 delimited by the diaphragm 16. This pressure prevailing in the pressure chamber 20 or the force which is a function of this pressure and acts in the closing direction of the valve 12 of the pressure reducer 10 is a function of the pressure prevailing in the outlet pressure chamber 14. Pressure chamber 20 and outlet pressure chamber 14 are coupled via a pressure line 25.

Not only does the diaphragm 16 engage with the valve tappet 15, but a valve body 21 does as well. In the closed position of the valve 12 of the pressure reducer 10, the valve body 21 bears against a valve seat 22 in a sealing manner, wherein in the open position of the valve 12 the valve body 21 is raised off the valve seat 22.

The valve seat 22 is provided by a sealing element 24 fixed to a support element 26.

As can be seen from FIG. 1, the spring element 17, together with the spring plates 18, 19, is received in an inner chamber delimited by a spring-casing portion 23 of the housing 11. On the side of the diaphragm 16 facing the spring element 17, the first spring plate 18 engages with a central section of the diaphragm 16.

The diaphragm 16 of the pressure reducer 10 separates a fluid-conducting region of the pressure reducer 10 from a non-fluid-conducting region thereof. The inlet pressure chamber 13, the outlet pressure chamber 14 and the pressure chamber 20 positioned below the diaphragm 16 are fluid-conducting.

The chamber defined by the spring-casing section 23 of the housing 11 in which the spring element 17 and the two spring plates 18, 19 are arranged is not fluid-conducting.

Accordingly, the spring element 17 and the two spring plates 18, 19 do not come into contact with fluid or water. By contrast, the valve body 21 is exposed to the fluid flow and thus comes into contact with fluid or water. The valve tappet 15 has a portion protruding into the non-fluid-conducting region of the pressure reducer 10 and a portion protruding into the fluid-conducting region of the pressure reducer 10.

A sensor 27 for detecting leakage is integrated into the pressure reducer 10, wherein the sensor 27 serves to detect leakage when the valve 12 is closed in a fluid chamber coupled to the outlet pressure chamber 14 or in a fluid line coupled to the outlet pressure chamber 14 of a water supply system or industrial plant in which the pressure reducer is installed.

In the preferred exemplary embodiment shown, said sensor 27 for leakage detection is integrated into the non-fluid-conducting region of the pressure reducer 10, wherein the sensor 27 in the illustrated, preferred exemplary embodiment is associated with the spring plate 18 facing the diaphragm 16 or cooperates with the spring plate 18 facing the diaphragm 16.

If the valve 12 of the pressure reducer 10 is closed and a leak occurs downstream of the valve 12 in the fluid chamber or the fluid line coupled to the outlet pressure chamber 14, this leads to a movement of the valve 12 in the micrometer range, which ultimately causes a movement in the micrometer range of the spring plate 18 facing the diaphragm 16, which can be detected with the aid of the sensor 27.

The sensor 27 is preferably mounted on an inner side of the spring-casing portion 23 of the housing 11 and is directed onto the spring plate 18 facing the diaphragm 16 so as to detect a movement of this spring plate 18 in the micrometer range.

The sensor 27 is preferably a capacitive or inductive sensor.

The sensor 27 is coupled to a control unit 28 via a data line 29 which is guided through a corresponding opening 30 in the spring-casing section 23 of the housing 11.

Although the arrangement of the sensor 27 at the position shown in FIG. 1, i.e. the association or the cooperation thereof with the spring plate 18 facing the diaphragm 16, is particularly preferred, the sensor 27 can also be integrated into the pressure reducer 10 at other positions. For example, it is possible to associate the sensor 27 with that portion of the valve tappet 15 which projects into the non-fluid-conducting region of the pressure reducer 10. In this case, however, it would then be necessary to guide the data line 29 outwards via the spring element 17. In principle, it is also possible to integrate the sensor 27 for detecting leakage into the fluid-conducting region of the pressure reducer, for example to associate it with the valve body 21 or to the portion of the valve tappet 15 protruding into the fluid-conducting region of the pressure reducer.

The pressure reducer 10 shown in FIG. 1 is an exclusively manually actuated pressure reducer which has an adjusting device 31 for manual adjustment.

In contrast, FIGS. 2 and 3 each show embodiments of pressure reducers 10 which have an actuator 32 for automatically actuating the pressure reducer 10. With regard to the remaining details, the pressure reducers 10 of FIGS. 2 and 3 basically coincide with the pressure reducer 10 of FIG. 1, so that the same reference signs are used for identical components to avoid unnecessary repetitions.

Thus a sensor 27 for leakage detection, which is coupled to a control unit 28, is also integrated into the pressure reducer 10 of FIGS. 2 and 3. If, on the basis of the measurement signal provided by the sensor 27, the control unit 28 detects a leakage which is greater than a limit value, the actuator 32, controlled by the control unit 28, can actuate the valve 12 in the closing direction and accordingly close it in order to avoid further leakage.

In FIG. 2, the unit comprising actuator 32 and control unit 28 is mounted on the spring-casing section 23 of the housing 11. In this case, the actuator 32 pulls on the valve tappet 15 in order to close the valve 32.

In FIG. 3, by contrast, the unit of actuator 32 and control unit 28 is mounted on the side of the pressure reducer 10 opposite the spring-casing section 23, wherein in FIG. 3 the actuator 32 then presses the valve body 21 against the valve seat via the valve tappet 15 in order to close the valve 12.

LIST OF REFERENCE SIGNS

10 Pressure reducer
11 Housing
12 Valve
13 Inlet pressure chamber
14 Outlet pressure chamber
15 Valve tappet
16 Diaphragm
17 Spring element
18 Spring plate
19 Spring plate
20 Pressure chamber
21 Valve body
22 Valve seat
23 Spring-casing section
24 Sealing element
25 Pressure line
26 Support element
27 Sensor
28 Control unit
29 Data line
30 Opening
31 Adjusting device
32 Actuator

The invention claimed is:
1. A pressure reducer comprising,
a housing comprising an inlet pressure chamber and an outlet pressure chamber;
a valve positioned in the housing,
wherein in a closed position the valve separates the inlet pressure chamber from the outlet pressure chamber, and in an open position the valve connects the inlet pressure chamber and the outlet pressure chamber,
wherein the valve comprises:
  a diaphragm acting on a valve tappet, on which diaphragm, by providing a pressure reducing function, a spring force of a spring element acting in an opening direction of the valve acts on the one hand and a force that is a function of the pressure prevailing in the outlet pressure chamber acting in a closing direction of the valve on the other hand;
  a valve body attached to the valve tappet, wherein the valve body, in the closed position of the valve, bears against a valve seat in a sealing manner and in the open position of the valve is raised off the valve seat; and
  wherein the spring element is arranged between a first spring plate facing the diaphragm and a second spring plate facing away from the diaphragm; and
a sensor configured to detect leakage,
wherein the sensor is integrated into a non-fluid-conducting region of the pressure reducer, and
wherein the sensor is associated with a portion of the valve tappet or cooperates with a portion of the valve tappet that protrudes into the non-fluid-conducting region of the pressure reducer.

2. The pressure reducer of claim 1, wherein the sensor is configured to detect leakage when the valve is closed in a fluid chamber coupled to the outlet pressure chamber or in a fluid line coupled to the outlet pressure chamber.

3. The pressure reducer of claim 1, wherein the sensor is associated with the first spring plate facing the diaphragm or cooperates with the first spring plate facing the diaphragm.

4. The pressure reducer of claim 1, further comprising a control unit, wherein the sensor is coupled to the control unit, and wherein the control unit is configured to detect a leakage greater than a limit value and close the valve in response to detecting the leakage greater than the limit value.

5. A pressure reducer comprising,
a housing comprising an inlet pressure chamber and an outlet pressure chamber;
a valve positioned in the housing,
wherein in a closed position the valve separates the inlet pressure chamber from the outlet pressure chamber, and in an open position connects the inlet pressure chamber and the outlet pressure chamber,
wherein the valve comprises:
  a diaphragm acting on a valve tappet, on which diaphragm, by providing a pressure reducing function, a spring force of a spring element acting in an opening direction of the valve acts on the one hand and a force that is a function of the pressure prevailing in the outlet pressure chamber acting in a closing direction of the valve acts on the other hand;
  a valve body attached to the valve tappet, wherein the valve body, in the closed position of the valve, bears against a valve seat in a sealing manner and in the open position of the valve is raised off the valve seat; and
  wherein the spring element is arranged between a first spring plate facing the diaphragm and a second spring plate facing away from the diaphragm; and
a sensor configured to detect leakage,
wherein the sensor is integrated into a non-fluid-conducting region of the pressure reducer, and
wherein the sensor is associated with the first spring plate facing the diaphragm or cooperates with the first spring plate facing the diaphragm.

6. The pressure reducer of claim 5, wherein the sensor is configured to detect leakage when the valve is closed in a fluid chamber coupled to the outlet pressure chamber or in a fluid line coupled to the outlet pressure chamber.

7. The pressure reducer of claim 5, wherein the sensor is associated with a portion of the valve tappet.

8. The pressure reducer of claim 5, wherein the sensor is associated with the valve body or cooperates with the valve body.

9. The pressure reducer of claim 5, further comprising a control unit, wherein the sensor is coupled to the control unit and, wherein the control unit is configured to detect a leakage greater than a limit value and close the valve in response to detecting the leakage greater than the limit value.

10. A pressure reducer comprising:
a housing comprising an inlet pressure chamber and an outlet pressure chamber;
a valve positioned in the housing,
wherein in a closed position the valve separates the inlet pressure chamber from the outlet pressure chamber, and in an open position connects the inlet pressure chamber and the outlet pressure chamber,
wherein the valve comprises:
  a diaphragm acting on a valve tappet, on which diaphragm, by providing a pressure reducing function, a spring force of a spring element acting in an opening direction of the valve acts on the one hand and a force that is a function of the pressure prevailing in the outlet pressure chamber acting in a closing direction of the valve acts on the other hand;
  a valve body attached to the valve tappet, wherein the valve body, in the closed position of the valve, bears against a valve seat in a sealing manner and in the open position of the valve is raised off the valve seat; and
  wherein the spring element is arranged between a first spring plate facing the diaphragm and a second spring plate facing away from the diaphragm; and
a sensor configured to detect leakage,
wherein the sensor is integrated into a fluid-conducting region of the pressure reducer,
wherein the sensor is associated with the valve body or cooperates with the valve body, and
wherein the sensor is configured to detect a movement of the valve body.

11. The pressure reducer of claim 10, wherein the sensor is configured to detect leakage when the valve is closed in a fluid chamber coupled to the outlet pressure chamber or in a fluid line coupled to the outlet pressure chamber.

12. The pressure reducer of claim 10, wherein the sensor is associated with a portion of the valve tappet.

13. The pressure reducer of claim 10, wherein the sensor is associated with a portion of the valve tappet or cooperates with a portion of the valve tappet that protrudes into a fluid-conducting region of the pressure reducer.

14. The pressure reducer of claim 10, further comprising a control unit, wherein the sensor is coupled to the control unit and, wherein the control unit is configured to detect a leakage greater than a limit value and close the valve in response to detecting the leakage greater than the limit value.

15. The pressure reducer of claim 10, wherein the sensor is configured to detect a movement of the valve body in the micrometer range when the valve is in the closed position.

\* \* \* \* \*